(No Model.) 3 Sheets—Sheet 1.
W. H. G. GREAVES.
PLOW.
No. 590,146. Patented Sept. 14, 1897.
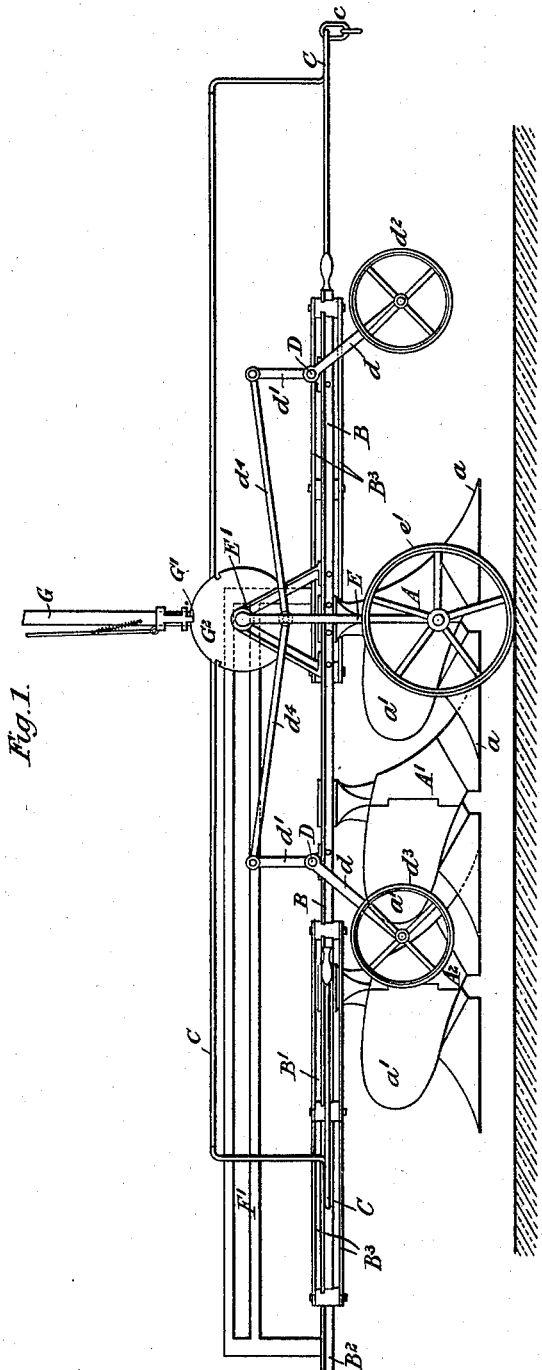
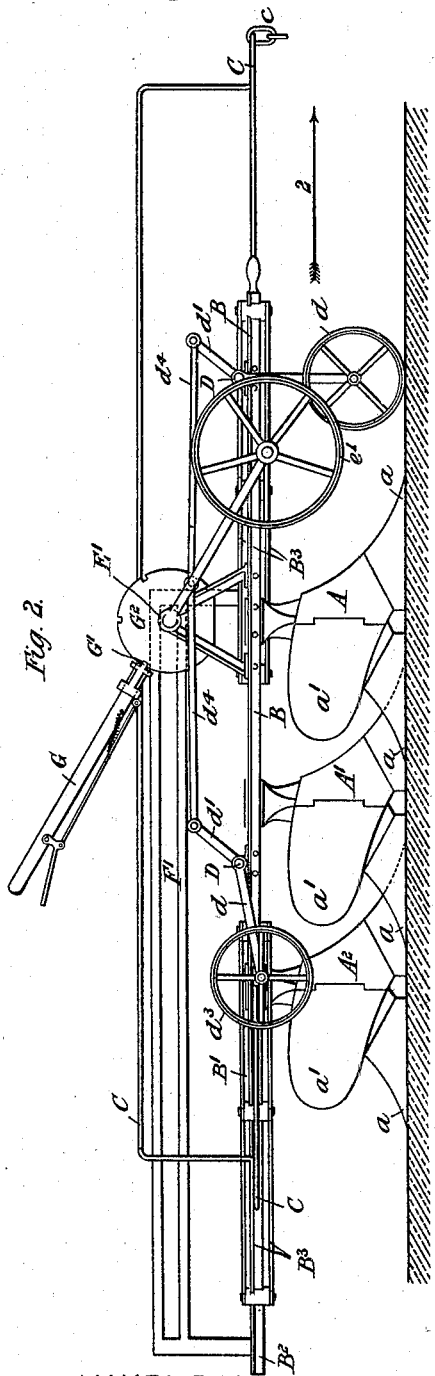
WITNESSES
F. W. Wright,
S. C. Connor
INVENTOR
Wm. H. G. Greaves
BY Howson & Howson
HIS ATTORNEYS.

(No Model.)  3 Sheets—Sheet 2.
W. H. G. GREAVES.
PLOW.
No. 590,146.  Patented Sept. 14, 1897.
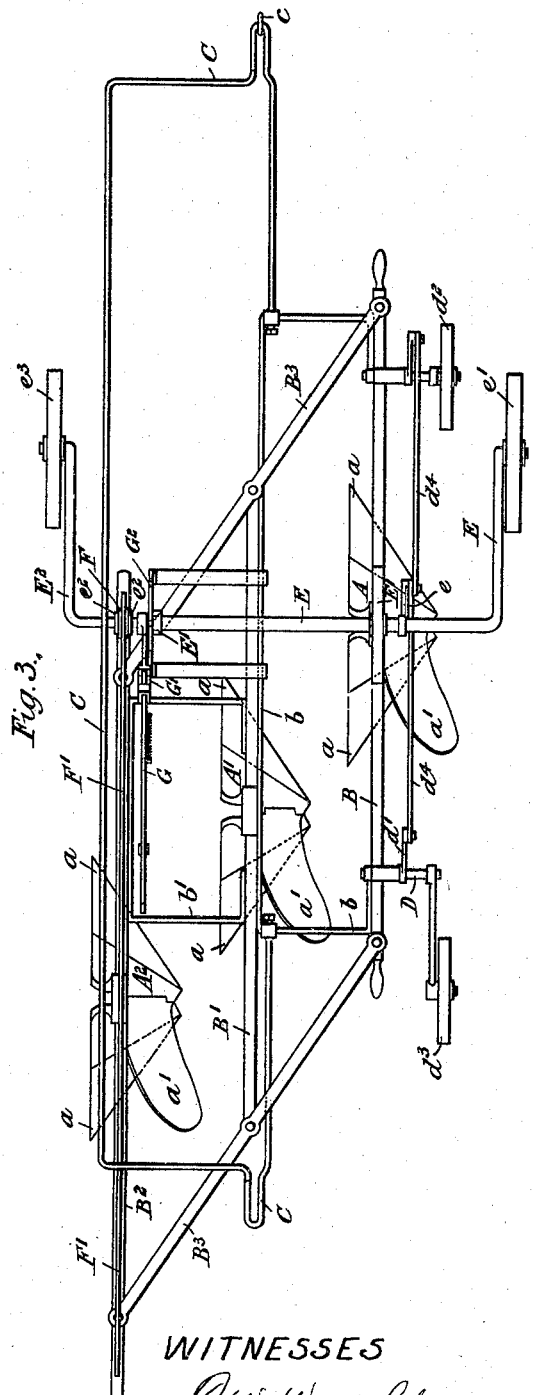
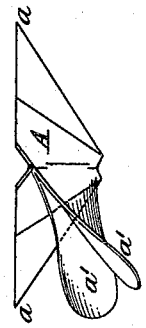
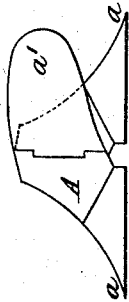
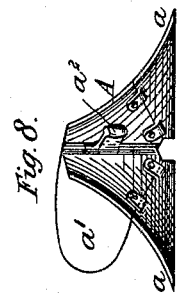
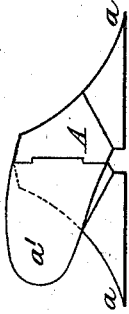
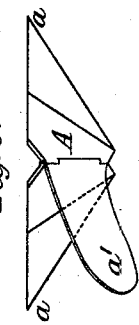
WITNESSES
J. W. Wright.
S. C. Connor.
INVENTOR
Wm. H. G. Greaves
BY Howson & Howson
HIS ATTORNEYS

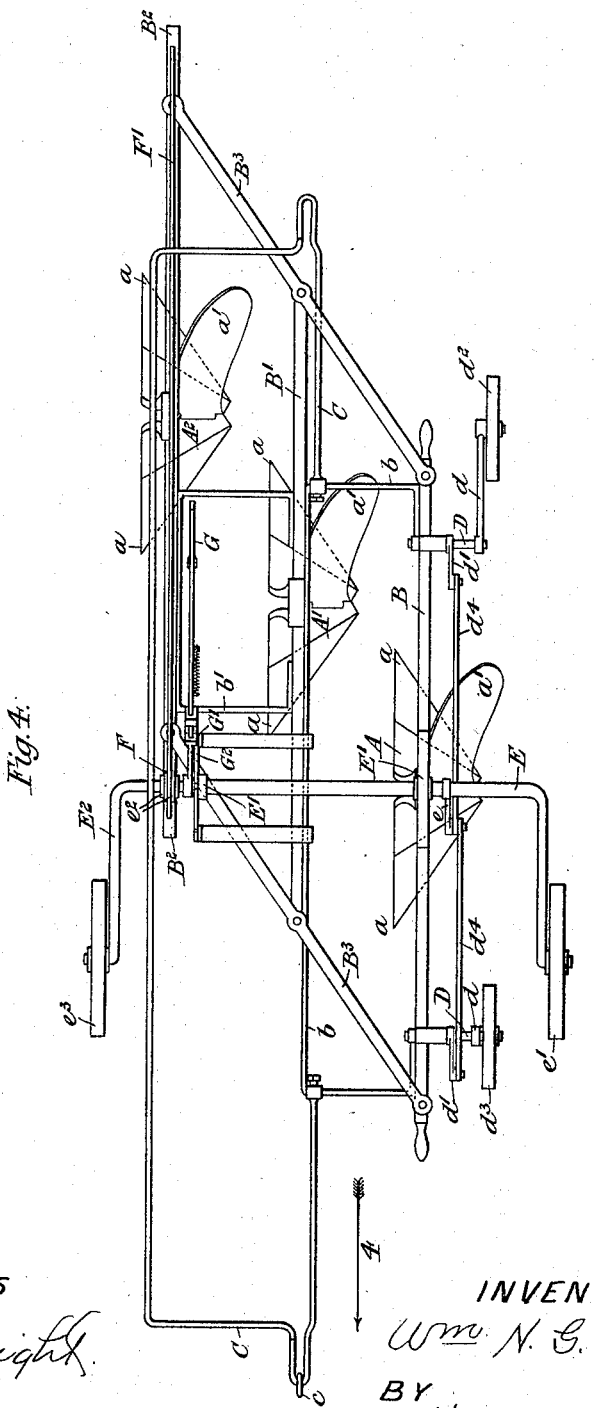

UNITED STATES PATENT OFFICE.

WILLIAM H. G. GREAVES, OF CRADOCK, CAPE COLONY.

PLOW.

SPECIFICATION forming part of Letters Patent No. 590,146, dated September 14, 1897.

Application filed December 26, 1896. Serial No. 617,046. (No model.)

*To all whom it may concern:*

Be it known that I, WILLIAM HENRY GILFILLAN GREAVES, farmer, a subject of the Queen of Great Britain and Ireland, residing at Cradock, Cape Colony, have invented certain Improvements in Plows, of which the following is a specification.

My invention has for its object to provide a plow which can be worked in either direction and traversed to and fro across or along the land to be plowed without turning the plow and also to provide means whereby the draft power can be transferred from one end to the other end of the plow without detaching the draft chain or rope from the plow.

The invention will be best understood by reference to the accompanying drawings, in which—

Figure 1 is a side elevation of a triple or three-share plow constructed according to my invention in its inoperative position—that is, with the plowshares raised off the ground. Fig. 2 is a side elevation corresponding to Fig. 1, showing the plow in its operative position for working in the direction indicated by the arrow 2. Fig. 3 is a plan of Fig. 2. Fig. 4 is a plan of the plow arranged for working in the direction indicated by the arrow 4. Figs. 5 and 6 are respectively a side elevation and a plan of one of the double plowshares arranged in the manner shown in Figs. 1, 2, and 3. Figs. 7 and 8 are elevations of respectively opposite sides of one of the plowshares arranged in the manner shown in Fig. 4. Fig. 9 is a plan of a modified form of the plowshare.

Like letters indicate like parts throughout the various figures of the drawings.

I will describe my invention first as applied to a multiple plow having three shares, as shown in the accompanying drawings, although it is not limited to that number.

According to my invention each of the plowshares A A' A² is formed double, with a nose or penetrating point $a$ at each end, and the moldboard or a portion $a'$ thereof is hinged to the share, so as to be capable of moving or of being moved into position to form a continuation of either portion of the double share. For example, it may form a continuation of either the right-hand portion, as shown in Figs. 1, 2, 3, 5, and 6, as when the plow is being moved in the direction indicated by the arrow 2 in Fig. 2, or the left-hand portion, as shown in Figs. 4 and 7, as when the plow is being moved in the direction indicated by the arrow 4 in Fig. 4. By this arrangement if the direction of traverse of the plow be reversed without turning the said plow the penetrating points $a$ and opposite sides of the moldboard $a'$ will be caused to act alternately.

To enable the draft power to be applied to either end of the plow without detaching the draft chain or rope from the plow, I connect to the two ends of the frame or beam B which carries the share A a rod or guide C, which extends over the top and along the "landside" of the frame or beam B—that is to say, the side adjacent to the unplowed land.

The draft chain or rope (which is not represented in the drawings) may be connected to the rod or guide C by a link $c$, so that when the direction of traverse of the plow is to be reversed it is only necessary to lead the draft-animals from the end of the plow to which they are then attached around the landside of the plow to the opposite end, when the link or connecting device $c$ will either automatically or with but little assistance travel along the rod or guide C into the proper position for the reversed operation of the plow.

When after the plowshares have plowed in one direction the plow is traversed in the opposite direction, the movable moldboards $a'$ of the said shares by the pressure of the earth against them will automatically turn into the position necessary for plowing in the reverse direction.

The movable moldboards $a'$ may be provided with an arm $a^2$, projecting through to the back of the share and adapted by bearing against fixed parts of the share to limit the swinging movement of the portion $a'$ to the required extent, or any other suitable stop may be provided for this purpose.

On the frame or beam B, I pivot two short shafts D, on each of which are secured two arms $d\ d'$. On the arms $d$ are pivoted furrow-wheels $d^2\ d^3$, and the arms $d'$ are connected by links $d^4$ with an arm $e$, secured on a shaft E, which is mounted in bearings E', connected to the frame or beam B. The shaft E is preferably tubular and is bent down at one end and has mounted on this end a wheel $e'$, which serves as a carrying-wheel for supporting the plow when the shares are off the ground, as shown in Fig. 1. Into the open end of the tubular shaft E is fitted a shaft $E^2$, which is capable of sliding longitudinally therein, but is prevented from rotating independently of the said shaft by means of a "feather" and keyway or other suitable device. The shaft $E^2$ passes through a bearing F, on which a frame or guide F', secured to the movable framing of the plow, is capable of moving, but only in a direction transverse to the axis of the shaft $E^2$. At each side of the bearing F the shaft $E^2$ is provided with collars $e^2$, which insure that while the said shaft is free to rotate in this bearing any lateral motion imparted to the latter will also be imparted to the shaft, as hereinafter more particularly described. The outer end of the shaft $E^2$ is bent down and carries a wheel $e^3$, which when the plow is in operation runs on the land at the side of the plow at which the land is unplowed. This wheel is hereinafter referred to as the "land-wheel."

G is a hand-lever secured at its lower end on the shaft E and provided with a spring-controlled bolt G', adapted to engage with the teeth or recess of a locking-quadrant $G^2$, mounted on the frame B. By means of the lever G the wheels $d^2 d^3$ and $e' e^3$ may be moved into either of their three necessary positions, in which they may be retained by means of the bolt G' and locking-quadrant $G^2$.

The plowshares A' $A^2$ are respectively carried on beams or frames B' $B^2$, which are connected to each other and to the beam or frame B by two or more radius-bars $B^3$, which admit of the plowshares A' $A^2$ being moved to either side of the share A, as shown in Figs. 3 and 4, respectively.

The before-described frame F' is secured to the beam or frame $B^2$, and when by reason of the draft being changed from one end to the other end of the plow the frames $B^2$ and F' are caused by the radius-bars $B^3$ to swing first away from and then toward the beam or frame B the said frame F' by acting through the bearing F on the shaft-collars $e^2$ carries the shaft $E^2$ and land-wheel $e^3$ (independently of the shaft E and carrying-wheel $e'$) along with it in the corresponding directions. At the same time the frame F' slips in its longitudinal direction freely over the bearing F, and by reason of the before-mentioned key or feather the land-wheel $e^3$ remains coaxial with the carrying-wheel $e'$.

On the beam B is secured a frame $b$ and on the beam B' is secured a frame $b'$. These frames $b b'$ serve as stops to limit the extent to which the beams B B' $B^2$ and the parts carried thereby shall be adjustable in relation to each other.

A chain or chains may be secured to the radius-bars $B^3$ or beams or frames B' $B^2$ and to the hand-lever G, by which arrangement the movement of the said hand-lever for adjusting the wheels $d^2 d^3$ and $e' e^3$, as before described, will also assist in moving the beams or frames B' $B^2$ so as to bring the plowshares A' $A^2$ to one side or the other of the plowshare A. This chain is not an indispensable adjunct, as the plowshares A A' $A^2$ may be caused to change their relative positions merely by the reversal of the draft from one to the other end of the plow, the resistance presented by the earth against the plowshares A' $A^2$ causing these latter to be swung to the rear of the plowshare A.

When the plow is to be moved in the direction indicated by the arrow 2 in Fig. 2, the lever G is moved in the opposite direction, which causes the furrow-wheel $d^2$ to descend, the furrow-wheel $d^3$ to ascend, and by moving the wheels $e' e^3$ upward and somewhat in the direction of the arrow 2 allows the plow to descend, so as to bring the plowshare onto the ground ready for plowing. At the end of the furrow the draft is reversed and the hand-lever G is moved in somewhat the direction of the arrow 2, after which the plow is ready for operation in the direction opposite to that indicated by the arrow 2.

The multiple plow instead of having three plowshares, as shown in the drawings, may have two, four, or other number of shares.

A single plow constructed according to this invention would practically consist of the beam B and frame $b$ and the parts directly connected thereto, and the hand-lever G, which in this example would only operate the wheels $d^2 d^3 e' e^3$, the adjustable beams B' $B^2$, radius-bars $B^3$, and plowshares, being dispensed with. As the width of the single plow would at all times be constant, the carrying-wheel $e'$ and land-wheel $e^3$ may be mounted on a rigid shaft instead of on a telescopic shaft, such as is found convenient in a multiple plow.

Instead of forming the reversible moldboard $a'$ of a single thickness, as shown in Figs. 1 to 8, inclusive, it may be formed double, as shown in Fig. 9, which will better allow of its being made in various shapes.

By the term "plow-body," hereinafter used in the claim, I mean the part comprising the stationary portions of the moldboard and the plowshares fitted thereto.

I claim as my invention—

In reversible plows, the combination of a frame having parallel beams swingingly connected by radius-bars, said frame carrying double-ended plowshares having reversible moldboards with a guide C extending along the landside from one end of the frame to the other for the draft connections, substantially as and for the purpose described.

In testimony whereof I have signed my name to this specification in the presence of two subscribing witnesses.

W. H. G. GREAVES.

Witnesses:
WILLIAM F. UPTON,
CHAS. MILLS.